United States Patent
Inoue et al.

(10) Patent No.: US 7,085,118 B2
(45) Date of Patent: Aug. 1, 2006

(54) ELECTROSTATIC DISCHARGE PROTECTION COMPONENT

(75) Inventors: Tatsuya Inoue, Takatsuki (JP); Hideaki Tokunaga, Fukui (JP); Eiichi Uriu, Hirakata (JP); Naotsugu Yoneda, Katano (JP); Takeshi Orita, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 88 days.

(21) Appl. No.: 10/818,811

(22) Filed: Apr. 6, 2004

(65) Prior Publication Data

US 2004/0233606 A1    Nov. 25, 2004

(30) Foreign Application Priority Data

Apr. 10, 2003   (JP)   ............... 2003-106406

(51) Int. Cl.
*H02H 1/00*   (2006.01)
(52) U.S. Cl. .................................. 361/119
(58) Field of Classification Search ............ 361/119
See application file for complete search history.

(56) References Cited

U.S. PATENT DOCUMENTS

| | | | | |
|---|---|---|---|---|
| 5,034,709 A | * | 7/1991 | Azumi et al. ........ | 333/184 |
| 5,159,300 A | * | 10/1992 | Nakamura et al. ...... | 333/184 |
| 5,278,526 A | * | 1/1994 | Ikeda .............. | 333/185 |
| 5,392,188 A | * | 2/1995 | Epstein ............ | 361/118 |
| 5,796,568 A | * | 8/1998 | Baiatu ............. | 361/106 |
| 5,952,040 A | * | 9/1999 | Yadav et al. ........ | 427/126.3 |
| 6,466,120 B1 | * | 10/2002 | Tokuda et al. ....... | 336/83 |
| 6,498,710 B1 | * | 12/2002 | Anthony ............ | 361/111 |
| 6,700,772 B1 | * | 3/2004 | Raghavendra et al. .. | 361/321.2 |
| 2002/0043698 A1 | * | 4/2002 | Raghavendra et al. .. | 257/528 |
| 2005/0059371 A1 | * | 3/2005 | Block et al. ........ | 455/217 |

FOREIGN PATENT DOCUMENTS

JP     63-056023 A    3/1988

* cited by examiner

*Primary Examiner*—Ronald Leja
(74) *Attorney, Agent, or Firm*—RatnerPrestia

(57) ABSTRACT

On the surface of a ceramic sinter, at least an external electrode for input, an external electrode for output, and external electrodes for grounding are disposed, and the ceramic sinter includes an inductor electrically connected to the external electrode for input and external electrode for output, and a varistor electrically connected to the external electrode for input and external electrodes for grounding. By connecting the inductor to the signal line of the circuit of an electronic appliance and connecting the varistor between the input side of the signal line and the ground, electrostatic discharge pulses of about 0.5 to 2 nanoseconds can be suppressed efficiently.

6 Claims, 14 Drawing Sheets

ELECTROSTATIC DISCHARGE PROTECTION COMPONENT

FIELD OF THE INVENTION

The present invention relates to an electrostatic discharge protection component (hereinafter referred to simply as protection component) used for protecting an electronic appliance from electrostatic discharge.

BACKGROUND OF THE INVENTION

In rapid progress of trend of smaller size and higher performance of electronic appliances such as cellphones, recently, the withstand voltage of the electronic components used in the electronic appliances tends to be lower. Accordingly, there is an increasing number of breakdown accidents of electric circuits inside the appliance due to electrostatic discharge pulse caused by contact between part of human body and terminal of electronic appliance. When electrostatic discharge is generated, a high voltage of a bout hundreds of volts to several kilovolts is generated and applied to the electronic appliance in a scant moment of 0.5 to 2 nanoseconds.

Hitherto, as measure against such electrostatic discharge pulse, it has been proposed to bypass the electrostatic discharge by disposing a varistor or zener diode between the incoming line of electrostatic discharge and the ground, and to suppress the voltage applied to the electric circuit of the appliance.

Moreover, as disclosed in Japanese Laid-open Patent No. S63-56023, in a satellite broadcast receiving apparatus comprising a plane antenna for satellite broadcast not grounded in direct current, and a converter connected to the plane antenna by way of a transmission line having an amplifying circuit in a front stage, a filter circuit composed of an inductive element for connecting the transmission line and the ground, and a capacitive element connected to a rear stage of the connection point of the inductive element and transmission line is provided between the plane antenna and the amplifying circuit, thereby preventing damage by electrostatic discharge. An air gap coil is used as the inductive element, and a capacitor is used as the capacitive element.

However, if attempted to suppress the voltage applied to the electric circuit of the appliance by bypassing the electrostatic discharge by using the varistor or zener diode or in the disclosed method, since the reaction speed of the elements such as varistor or zener diode to the electrostatic discharge pulse is slow, sufficient bypassing effect is not obtained. Although somewhat different depending on the size or composition of the elements, electrostatic discharge occurring in about 0.5 to 2 nanoseconds cannot be bypassed sufficiently. Therefore, existing protection components cannot suppress sufficiently the highest peak voltage in about 0.5 to 2 nanoseconds occurring as electrostatic discharge, and it has been difficult to prevent breakdown of electronic components or electronic appliances securely. However, when a varistor or zener diode of very high capacity such as several nF unit or more is used, peak voltage of about 0.5 to 2 nanoseconds may be suppressed to a certain extent. But such element cannot be used in a high speed transmission circuit of more than tens of MHz units.

SUMMARY OF THE INVENTION

The protection component of the invention comprises:
  at least three external electrodes for input, output and grounding disposed on the surface of a ceramic sinter,
  the ceramic sinter includes:
    an inductor electrically connected the external electrode for input and the external electrode for output, and
    a varistor electrically connected the external electrode for input and the external electrode for grounding.

In this configuration, in a signal line of circuit of electronic appliance, an inductor of the protection component is connected, and the varistor is connected between the input side of the signal line and the grounding side, and thereby electrostatic discharge pulse can be prevented effectively. That is, the inductor connected in series to the signal line becomes relatively high in impedance against the high frequency components in the leading section of electrostatic discharge pulse. Accordingly, the inductor suppresses passing of electrostatic discharge pulse to the signal line, and the varistor characteristic is dominant, thereby bypassing to the grounding side in a short time by the varistor, and the voltage applied to the protected circuit is substantially decreased. As a result, it can suppress the peak voltage of about 0.5 to 2 nanoseconds of electrostatic discharge pulse not controlled sufficiently by the conventional protection component, and application of electrostatic discharge pulse to the circuit of electronic appliance can be prevented. Moreover, since the inductor is disposed in series to the signal line and the varistor is disposed parallel in L-configuration, the inductance of the inductor and the capacitance of the varistor may be combined to function as a low pass filter (noise filter). Thus, two functions are realized at the same time, and by using one component only, the size of the appliance can be reduced, and the mounting cost is also lowered.

DETAILED DESCRIPTION OF THE INVENTION

Figure 1:
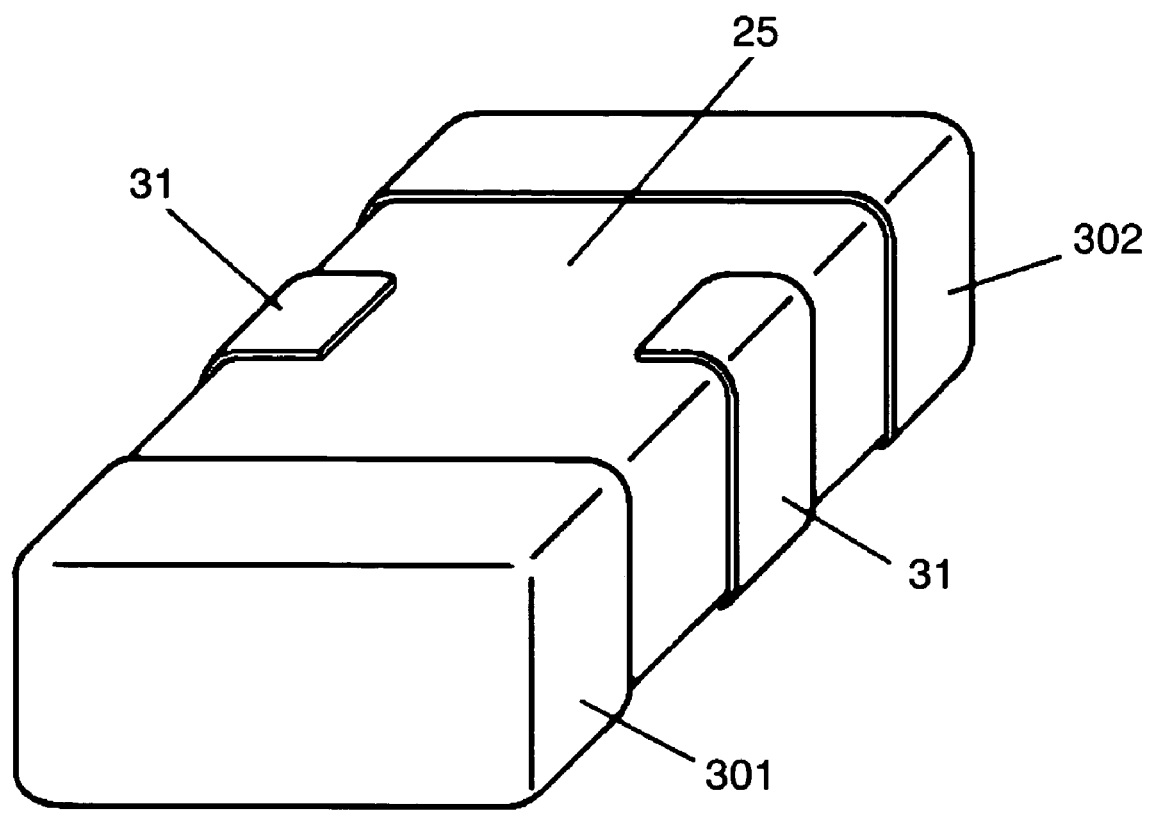
FIG. 1 is an outline perspective view of protection component in exemplary embodiment 1 of the invention.

Referring now to the drawings, exemplary embodiments of the invention are described below. Same elements are identified with same reference numerals, and duplicate explanation may be omitted.

FIRST EXEMPLARY EMBODIMENT

Figure 2:
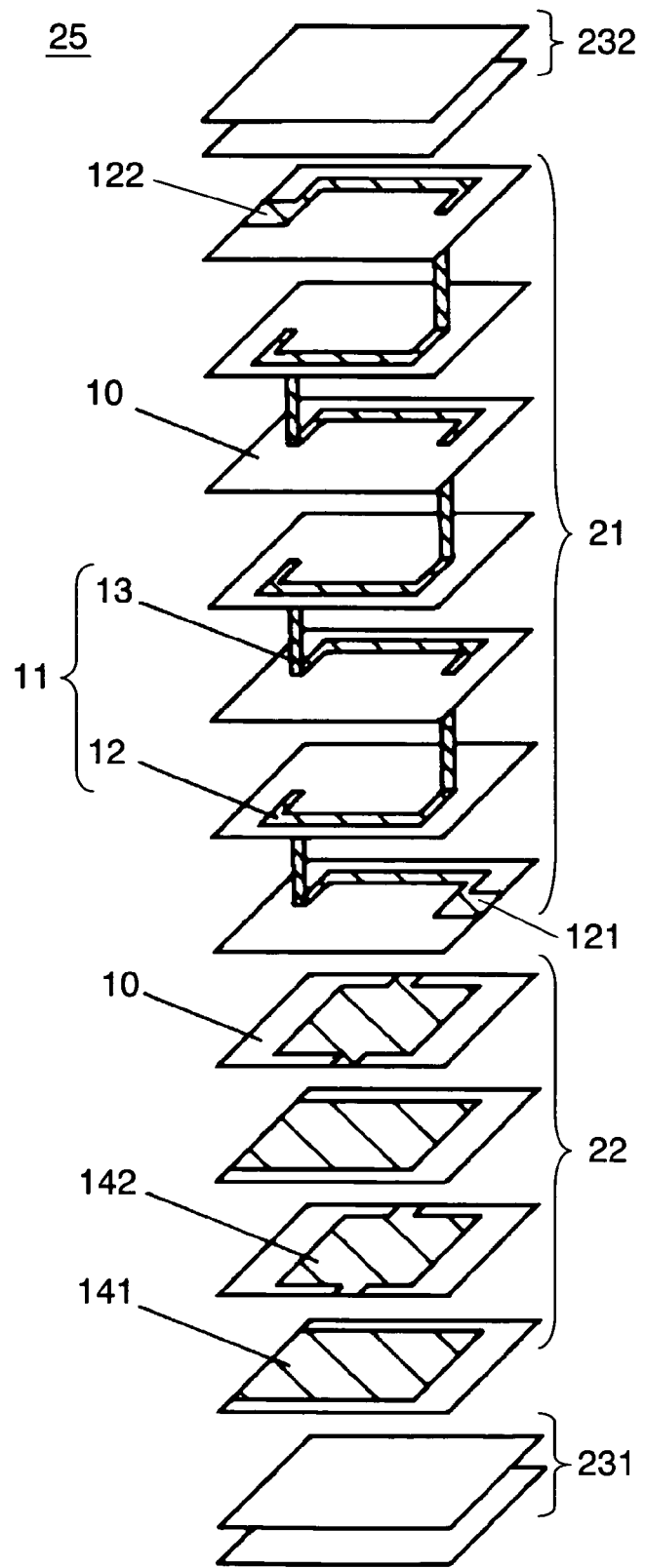
FIG. 2 is a schematic perspective exploded view of ceramic sinter for composing the protection component in the exemplary embodiment.
Figure 3:
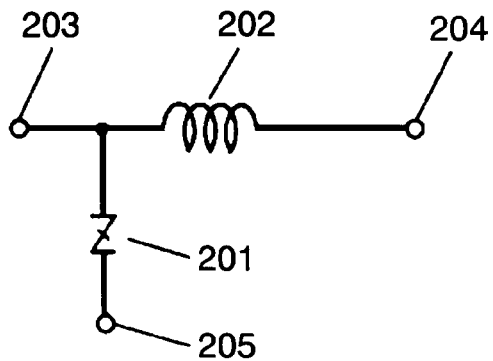
FIG. 3 is an equivalent circuit diagram of the protection component.

FIG. 1 is an outline perspective view of a protection component in exemplary embodiment 1 of the invention, and FIG. 2 is a schematic perspective exploded view of ceramic sinter for composing this protection component. FIG. 3 is an equivalent circuit diagram of the protection component.

The protection component of the invention comprises an external electrode for input 301 and an external electrode for output 302 disposed at both shorter sides of a ceramic sinter 25, and external electrodes for grounding 31 disposed at both longer sides. The internal structure of the ceramic sinter 25 is shown in FIG. 2. The ceramic sinter 25 is an integrated laminated body of varistor 22, inductor 21, and cover layers 231, 232 as surface protective layers.

The inductor 21 includes a wiring conductor 12 formed in a ceramic layer 10, and a via conductor 13 filling up a via (not shown) opened in the ceramic layer 10, which are connected together to form a spiral coil conductor 11, and ends 121, 122 of the coil conductor 11 are drawn out to both shorter sides of the ceramic sinter 25. In FIG. 2, the wiring conductor 12 is formed on seven ceramic layers 10, and connected by the via conductor 13 formed in six vias, and the coil conductor 11 of 3.5 turns is formed.

The varistor 22 is formed by laminating the ceramic layer 10, and first internal electrode 141 and second internal electrode 142 different in shape formed on the ceramic layer 10, alternately in four layers, and the end of the first internal electrode 141 is drawn out to the shorter side of the ceramic sinter 25, and the end of the second internal electrode 142 is drawn out to both longer sides. As known from the diagram, the first internal electrode 141 contacts with one shorter side of the ceramic sinter 25, but is deviated so as not to contact with other shorter side. The second internal electrode 142 contacts with both longer sides. The first internal electrode 141 and second internal electrode 142 are laminated alternately on the ceramic layer 10. However, FIG. 2 is a schematic diagram, and the number of layers of lamination varies with the required inductance value or capacitance value.

At one shorter side of the ceramic sinter 25 having such internal structure, the external electrode for input 301 electrically connected to one end 122 of the coil conductor 11 and the end of the first internal electrode 141 is formed. At other shorter side of the ceramic sinter 25, the external electrode for output 302 electrically connected to other end 121 of the coil conductor 11 is formed. Further, in the middle of both longer sides of the ceramic sinter 25, the external electrode for grounding 31 electrically connected to the second internal electrode 142 is formed. Thus, the external electrode for input 301, external electrode for output 302, and external electrode for grounding 31 are formed ion the ceramic sinter 25, and the protection component of the exemplary embodiment is composed.

That is, the protection component of the exemplary embodiment is an integral structure of inductor and varistor formed in the ceramic sinter 25. The end 122 of the inductor 21 is connected to the external electrode for input 301, and other end 121 is connected to the external electrode for output 302, electrically. In the varistor 22, the end of the first internal electrode 141 is connected to the external electrode for input 301, and the end of the second internal electrode 142 is connected to the external electrode for grounding 31, electrically.

FIG. 3 is an equivalent circuit diagram of the protection component of the exemplary embodiment. In FIG. 3, a varistor 201 corresponds to the varistor 22 of the ceramic sinter 25, and an inductor 202 corresponds to the inductor 21 of the ceramic sinter 25. Similarly, an external electrode for input 203, an external electrode for output 204, and an external electrode for grounding 205 correspond to the external electrode for input 301, external electrode for output 302, and external electrode for grounding 31 in FIG. 1, respectively.

In this exemplary embodiment, on the basis of the shape shown in FIG. 1, the region of forming the external electrode for input 301 and external electrode for output 302 forms shorter sides, but these external electrodes may not be always formed at the shorter sides. That is, depending on the internal structure, the external electrode for input 301 and external electrode for output 302 may be formed at the longer sides, and the external electrodes for grounding 31 may be formed at the shorter sides.

A manufacturing method of the protection component in the exemplary embodiment is explained below while referring to FIG. 1 and FIG. 2.

First of all, a green sheet of zinc oxide is fabricated by using ceramic powder mainly composed of zinc oxide and an organic binder. At this time, the thickness of the green sheet is about 50 μm. In this exemplary embodiment, after sintering the zinc oxide green sheet, a ceramic layer 10 is obtained, and hence the ceramic layer 10 is hereinafter referred to as zinc oxide green sheet 10. The internal electrode and wiring conductor are expressed the same before and after baking.

Consequently, a plurality of zinc oxide green sheets 10 are laminated, and a lower side cover layer 231 is formed. In FIG. 2, two cover layers 231 are shown. In succession, similar zinc oxide green sheets 10 are laminated on the cover layer 231, and a metal paste mainly composed of silver is applied thereon by screen printing method, and a first internal electrode 141 is formed. After laminating zinc oxide green sheets 10 of the same shape thereon, a silver paste is applied by screen printing method, and a second internal electrode 142 is formed. By repeating the same process, a varistor 22 is formed.

On this varistor 22, zinc oxide green sheets 10 of the same shape are laminated thereon, a silver paste is applied by screen printing method, and a semicircular wiring conductor 12 is formed. At a position connecting electrically with one end of the wiring conductor 12, a zinc oxide green sheet 10 having a via conductor 13 is laminated. This via conductor 13 is formed by filling a via (not shown) provided in the zinc oxide green sheet 10 with a silver paste. Further, on this zinc oxide green sheet 10, a silver paste is applied by screen printing method, and the remaining semicircular wiring conductor 12 is formed. By repeating the same process hereinafter, an inductor 21 as shown in FIG. 2 is formed. Several zinc oxide green sheets 10 of same shape are laminated thereon, and an upper side cover layer 232 is formed, and thus a laminated body block is fabricated.

The thickness of the first internal electrode 141, second internal electrode 142, and wiring conductor 12 is about 2.5 µm. In the actual process, a plurality of the shape as shown in FIG. 2 are fabricated at the same time, and the laminated body block is cut into individual green chips, and by heating in the atmosphere and removing the binder, they are heated and sintered at 930° C. in the atmosphere.

By processing the ends of the sinter, the first internal electrode 141, second internal electrode 142, and ends 121, 122 of the wiring conductor 12 are exposed at the ends. Further, at the shorter sides and longer sides of the ceramic sinter 25, a conductor paste mainly composed of silver is applied and baked at 800° C., and an external electrode for input 301, an external electrode for output 302, and an external electrode for grounding 31 are formed. Finally, by plating and forming a laminated layer film of nickel and solder, the protection component in the exemplary embodiment as shown in FIG. 1 is fabricated.

The obtained protection component of the exemplary embodiment measures 1.6 mm in the longitudinal direction, 0.8 mm in the lateral direction, and 0.8 mm in the thickness direction. The capacitance between the external electrode for input 301 and external electrode for grounding 31 is 75 pF, and the varistor voltage V (1 mA), that is, the voltage when a current of 1 mA flows is V=27 V. Incidentally, the inductance can be changed freely by varying the length of the coil conductor 11 by adjusting the number of layers when fabricating the inductor 21. In this exemplary embodiment, two samples are prepared, having the inductance between the external electrode for input 301 and external electrode for output 302 of 68 nH and 220 nH.

Figure 4:
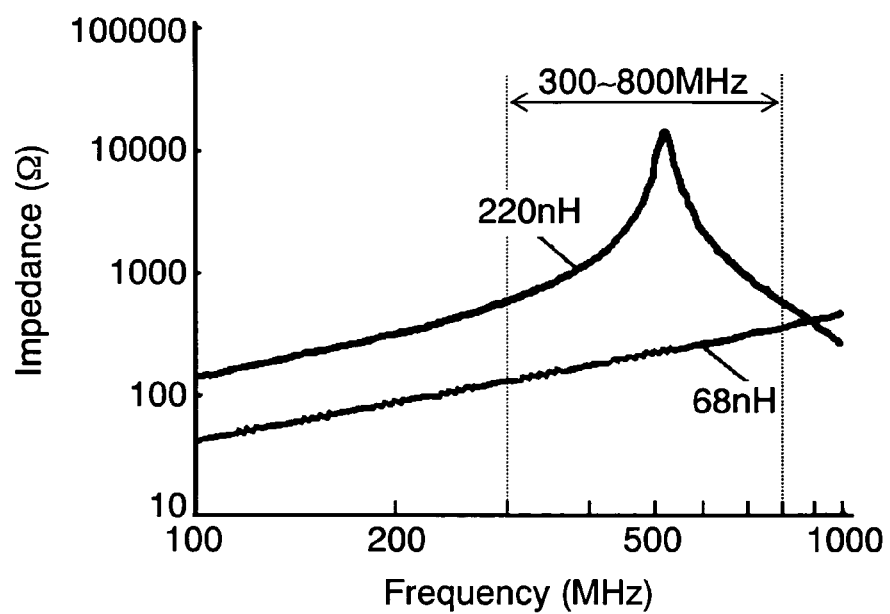
FIG. 4 is a diagram showing results of measurement of frequency characteristic of impedance of the protection component.

In these two samples, the impedance frequency characteristics were measured in the inductor 21, that is, between the external electrode for input 301 and external electrode for output 302. Results are shown in FIG. 4. As shown in FIG. 4, in a frequency band of measuring frequency ranging from 300 MHz to 800 MHz, the impedance of the sample of which inductance is 68 nH is 200 Ω or less. In the sample with inductance of 220 nH, it is 200 Ω or more in all band.

Figure 5:
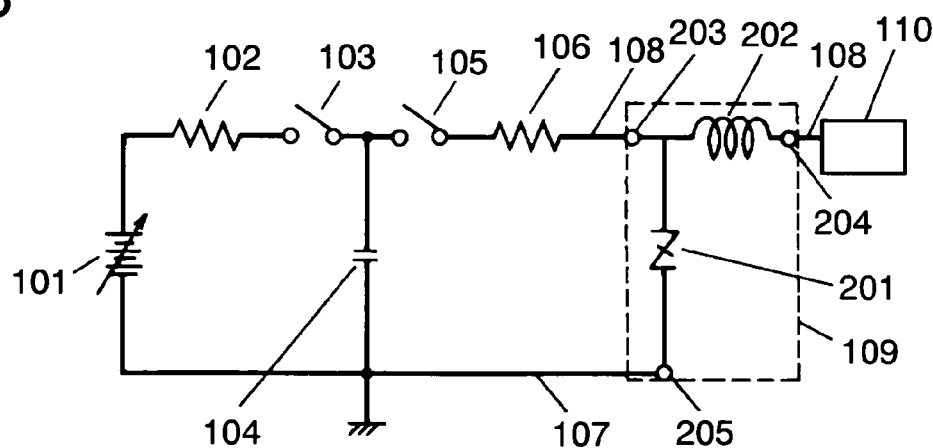
FIG. 5 is a circuit diagram of electrostatic discharge test in the exemplary embodiment.

Next, an electrostatic discharge test was conducted. FIG. 5 shows a circuit block diagram for the electrostatic discharge test. By connecting a switch 103, a specified voltage is applied from a direct-current power source 101 by way of resistor 102, and a capacity box 104 of capacitance of 150 pF is charged with an electric charge. By releasing the switch 103 and connecting a switch 105, the electric charge accumulated in the capacity box 104 is applied as electrostatic discharge pulse to a protected appliance 110 by way of resistor 106 and signal line 108.

As shown in FIG. 5, the protection component of the exemplary embodiment is connected as an evaluation sample 109. That is, the external electrode for input 203 is connected to the input side of the signal line 108, that is, the resistor 106 side, the external electrode for output 204 is connected to the output side of the signal line 108, that is, to the protected appliance 110 side, and the external electrode for grounding 205 is connected to the ground line 107. In this connection configuration, the inductor 202 is connected in series to the signal line 108 connected to the protected appliance 110, and the varistor 201 is connected between the input side of the signal line 108 and the ground line 107. In this circuit configuration, by applying an electrostatic discharge pulse, the voltage waveform was measured between the signal line 108 immediately before the protected appliance 110 and the ground line 107. By this measurement, it was attempted to evaluate the effect of suppressing the voltage applied to the protected appliance 110 by bypassing the electrostatic discharge pulse, that is, the absorption suppressing effect of the electrostatic discharge pulse of the protection component of the evaluation sample 109.

By way of comparison, a conventional laminated varistor of which capacitance is 75 pF and varistor voltage V (1 mA) is 27 V connected between the signal line 108 and ground line 107, and the absorption suppressing effect of the electrostatic discharge pulse is evaluated. The performance is also measured in the absence of the laminated varistor or the protection component of the exemplary embodiment.

Figure 6:
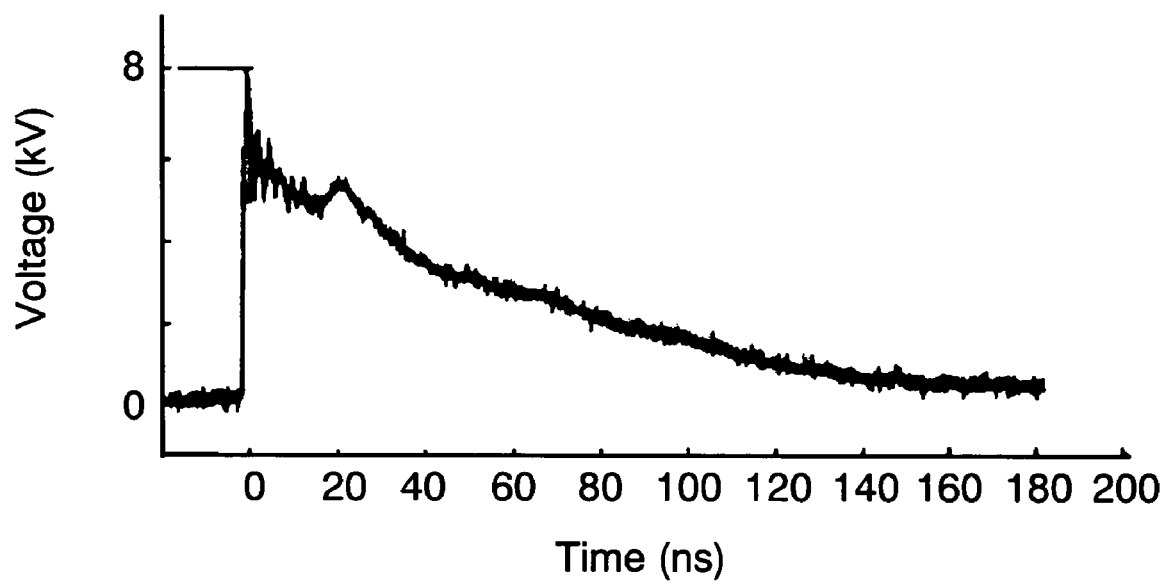
FIG. 6 is a voltage waveform diagram when 8 kV is applied as electrostatic discharge pulse in the absence of evaluation sample in electrostatic discharge test circuit in the exemplary embodiment.

Voltage waveforms of evaluation results are shown in FIG. 6, FIG. 7, FIG. 8, and FIG. 9. In these diagrams, the axis of abscissas denotes the time and the axis of ordinates represents the measured voltage. FIG. 6 shows the voltage waveform when the protection component is not provided, that is, when 8 kV is applied as electrostatic discharge pulse in the absence of evaluation sample 109 in the electrostatic discharge testing circuit in FIG. 5.

Figure 7:
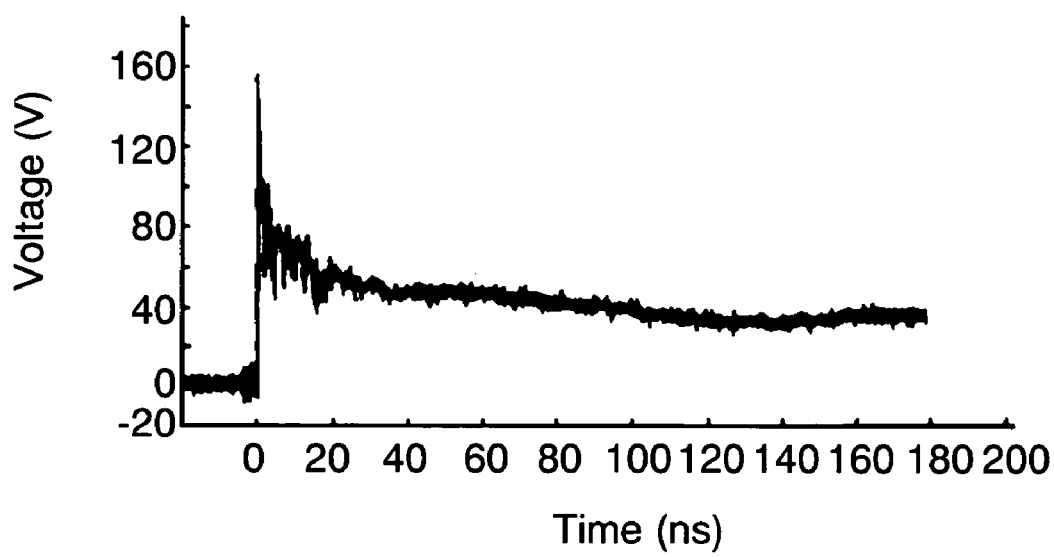
FIG. 7 is a diagram of voltage waveform applied to the protected appliance when a conventional laminated varistor is connected between signal line and grounding line.

FIG. 7 shows the voltage waveform applied to the protected appliance 110 when the conventional laminated varistor is connected between the signal line 108 and ground line 107.

Figure 8:
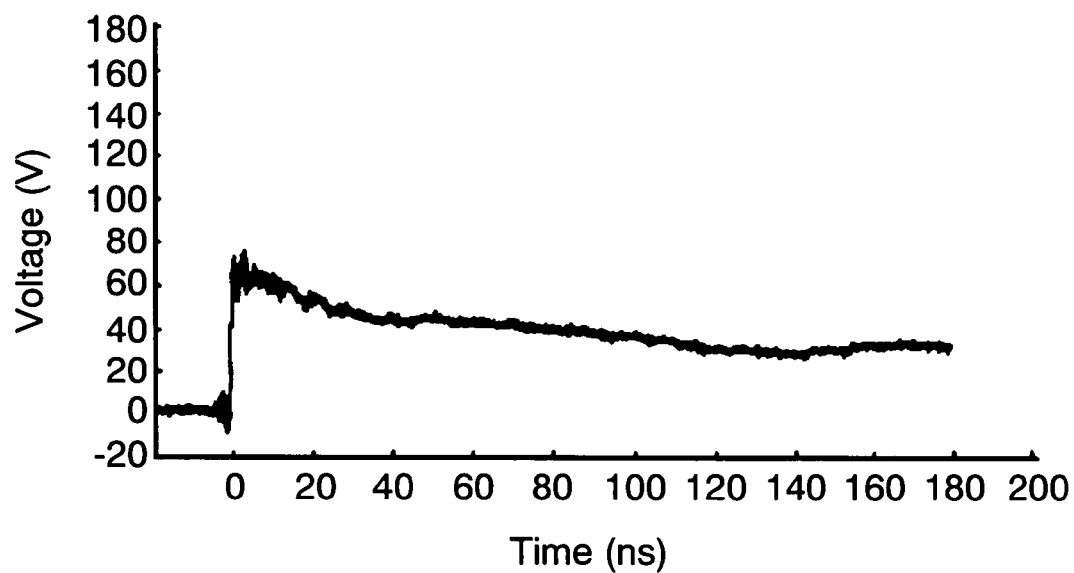
FIG. 8 is a diagram of voltage waveform applied to the protected appliance furnished with the protection component with inductance of 68 nH in the exemplary embodiment.
Figure 9:
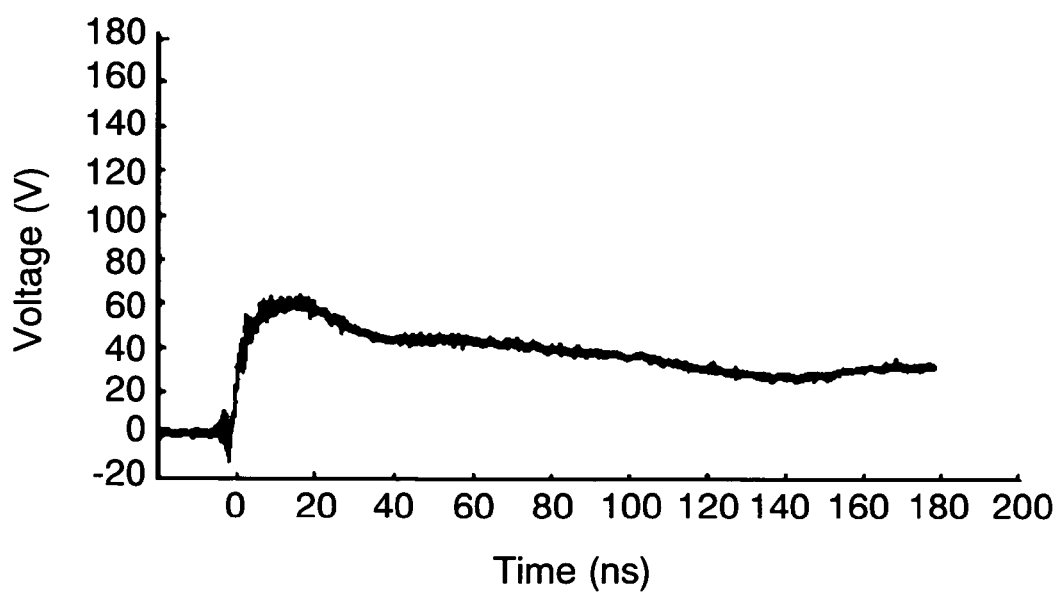
FIG. 9 is a diagram of voltage waveform applied to the protected appliance furnished with the protection component with inductance of 220 nH in the exemplary embodiment.

FIG. 8 shows the voltage waveform applied to the protected appliance 110 when the protection component of the exemplary embodiment of which inductance is 68 nH is disposed. FIG. 9 shows the voltage waveform applied to the protected appliance 110 when the protection component of the exemplary embodiment of which inductance is 220 nH is disposed.

As clear from evaluation results in FIG. 7, FIG. 8 and FIG. 9, when using the conventional laminated varistor in FIG. 7, the peak voltage is 155 V. By contrast, in the case of the protection component of the exemplary embodiment, although the capacitance and varistor voltage V (1 mA) of the varistor 22 are the same, the peak voltage is 75 V in FIG. 8 and the peak voltage is 65V in FIG. 9, and an outstanding voltage suppressing effect is recognized.

That is, when the protection component of the exemplary embodiment is disposed, the varistor is connected to the signal line input side and ground line, and the inductor is connected to the signal line in series. As a result, the inductor connected in series to the signal line becomes relatively high in impedance to the high frequency component in the leading section of the electrostatic discharge pulse, and passing of electrostatic discharge pulse to the signal line is suppressed, and the varistor characteristic becomes dominant, and the electrostatic discharge pulse can be bypassed to the ground side in a short time by the varistor, so that the voltage applied to the protected appliance can be substantially decreased.

As clear from comparison of waveforms between FIG. 8 and FIG. 9, the inductor 21 of the protection component of the exemplary embodiment has a particularly excellent absorption suppressing effect on the electrostatic discharge pulse when the impedance is 200 Ω or more in a frequency band of measuring frequency of 300 MHz to 800 MHz. More specifically, in the voltage waveform in FIG. 8, that is, in the frequency band of measuring frequency of 300 MHz to 800 MHz, in the case of protection component with the impedance of 200 Ω or less and the inductance of 68 nH, the voltage waveform applied to the protected appliance 110 has a peak voltage of about 75 V in the leading time of about 0.5 to 2 nanoseconds. By contrast, in the voltage waveform in FIG. 9, that is, in all frequency band of measuring frequency of 300 MHz to 800 MHz, in the case of protection component with the impedance of 200 Ω or more and the inductance of 220 nH, the voltage waveform applied to the protected appliance 110 has no peak voltage in the leading time of about 0.5 to 2 nanoseconds, and the peak voltage itself is as small as about 65 V. That is, the protection component of the exemplary embodiment has an outstanding absorption suppressing effect on high frequency components in the leading section of the electrostatic discharge pulse when the impedance of the inductor 21 is 200 Ω or more in the frequency band of measuring frequency of 300 MHz to 800 MHz, so that the voltage applied to the protected appliance can be lowered.

SECOND EXEMPLARY EMBODIMENT

Figure 10:
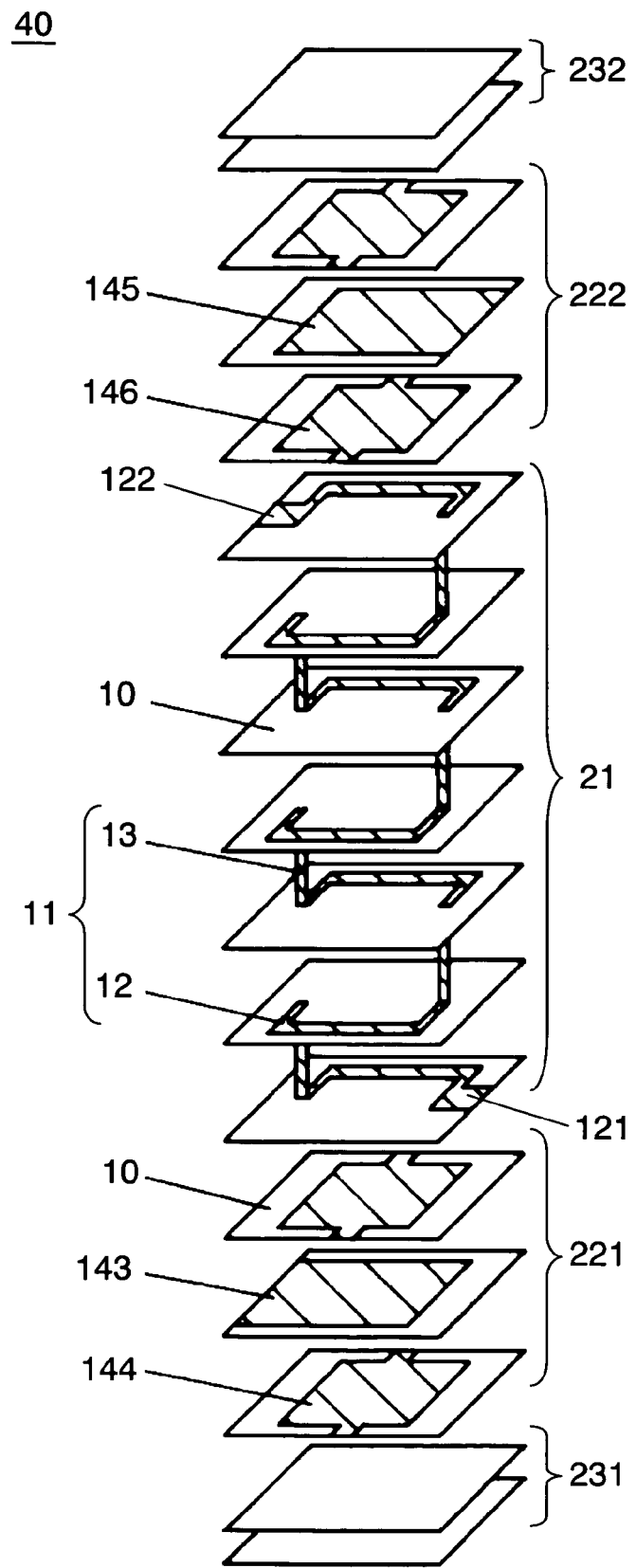
FIG. 10 is a schematic perspective exploded view of ceramic sinter for composing a protection component in exemplary embodiment 2 of the invention.
Figure 11:
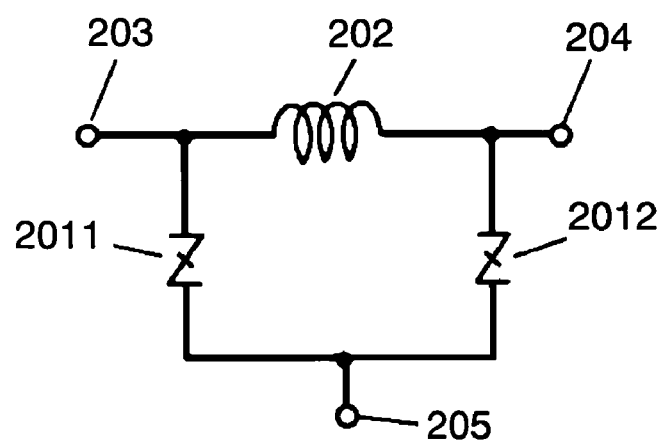
FIG. 11 is an equivalent circuit diagram of the protection component in the exemplary embodiment.

FIG. 10 is a schematic perspective exploded view of ceramic sinter 40 for composing a protection component in exemplary embodiment 2 of the invention. FIG. 11 is an equivalent circuit diagram of this protection component. What the protection component of this exemplary embodiment differs from the protection component in exemplary embodiment 1 lies in the structure of the ceramic sinter. That is, in this exemplary embodiment, it is characteristic that the ceramic sinter has one inductor and two varistors. The outline shape of the protection component of the exemplary embodiment is same as exemplary embodiment 1 shown in FIG. 1, and FIG. 1 is cited as required. Same constituent components are identified with same reference numerals.

A ceramic sinter 40 composing the protection component of the exemplary embodiment is an integrated laminated body of first varistor 221, second varistor 222, inductor 21, and cover layers 231, 232 as surface protective layers.

The inductor 21 includes a wiring conductor 12 formed in a ceramic layer 10, and a via conductor 13 filling up a via (not shown) opened in the ceramic layer 10, which are connected together to form a spiral coil conductor 11. Ends 121, 122 of the coil conductor 11 are drawn out to both shorter sides of the ceramic sinter 25. This is same as in the ceramic sinter 25 in exemplary embodiment 1, and in FIG. 10, the wiring conductor 12 is formed on seven ceramic layers 10, and connected by the via conductor 13 formed in six vias, and the coil conductor 11 of 3.5 turns is formed.

The first varistor 221 is formed by laminating the ceramic layer 10, and first internal electrode 143 and second internal electrode 144 different in shape formed on the ceramic layer 10 alternately, and the end of the first internal electrode 143 is drawn out to the shorter side of the ceramic sinter 40, and the end of the second internal electrode 144 is drawn out to this shorter side and both longer sides in the vertical direction.

The second varistor 222 is also formed by laminating the ceramic layer 10, and first internal electrode 145 and second internal electrode 146 formed on the ceramic layer 10 alternately, and the first internal electrode 145 is drawn out to the other shorter side of the ceramic sinter 40, and the end of the second internal electrode 146 is drawn out to this shorter side and both longer sides in the vertical direction.

As known from the diagram, the end of the first internal electrode 143 of the first varistor 221 and the end of the first internal electrode 145 of the second varistor 222 are drawn out to mutually different shorter sides. On the other hand, the second internal electrode 144 of the first varistor 221 and the second internal electrode 146 of the second varistor 222 are both drawn out to both longer sides.

Further, as shown in the drawing, the first varistor 221 and second varistor 222 are formed to enclose the inductor 21. In this structure shown in FIG. 10, the inductor 21 is formed by laminating seven ceramic layers 10 and the first varistor 221 and second varistor 222 are formed by laminating three ceramic layers 10 respectively, but it is only shown schematically, and the number of layers may be varied freely depending on the required inductance value or capacitance value.

At one shorter side of the ceramic sinter 40 having such internal structure, the external electrode for input 301 electrically connected to one end 122 of the coil conductor 11 and the end of the first internal electrode 143 of the first varistor 221 is formed. At other shorter side of the ceramic sinter 40, the external electrode for output 302 electrically connected to other end 121 of the coil conductor 11 and the first internal electrode 145 of the second varistor 222 is formed. Further, in the middle of both longer sides of the ceramic sinter 40, the external electrode for grounding 31 electrically connected to the second internal electrode 144 of the first varistor 221 and the second internal electrode 146 of the second varistor 222 is formed. Thus, the external electrode for input 301, external electrode for output 302, and external electrode for grounding 31 are formed ion the ceramic sinter 40, and the protection component of the exemplary embodiment is composed. Therefore, the outline configuration of the protection component of the exemplary embodiment is same as that of the protection component of exemplary embodiment 1 shown in FIG. 1.

However, the protection component of the exemplary embodiment is an integral structure of one inductor 21 and two varistors, that is, first varistor 221 and second varistor 222, formed integrally in the ceramic sinter 40. The inductor 21 is connected to the external electrode for input 301 and the external electrode for output 302, electrically, the first varistor 221 is connected to the external electrode for input 301 and the external electrode for grounding 31, electrically, and the second varistor 222 is connected to the external electrode for output 302 and the external electrode for grounding 31, electrically, In this exemplary embodiment, on the basis of the shape shown in FIG. 1, the region of forming the external electrode for input 301 and external electrode for output 302 forms shorter sides, but these external electrodes may not be always formed at the shorter sides. That is, depending on the internal structure, the external electrode for input 301 and external electrode for output 302 may be formed at the longer sides, and the external electrodes for grounding 31 may be formed at the shorter sides.

FIG. 11 is an equivalent circuit diagram of the protection component of the exemplary embodiment. In FIG. 11, a first varistor 2011 and a second varistor 2012 correspond respectively to the first varistor 221 and second varistor 222. An inductor 202 corresponds to the inductor 21. Similarly, the external electrode for input 301, external electrode for output 302, and external electrode for grounding 31 in FIG. 1 respectively correspond to an external electrode for input 203, an external electrode for output 204, and an external electrode for grounding 205 in FIG. 11.

As known from the equivalent circuit in FIG. 11, in the protection component of the exemplary embodiment, the first varistor 2011 and second varistor 2012 are disposed parallel so as to connect the both end of the inductor 202 and the external electrode for grounding 205.

The manufacturing method of the protection component of the exemplary embodiment is nearly same as the manufacturing method shown in exemplary embodiment 1, and detailed description is omitted. In this exemplary embodiment, however, after forming the first varistor 221 and inductor 21, by repeating the process of laminating further the ceramic layers 10, forming the second internal electrode 146, laminating the ceramic layer 10 again, and forming the first internal electrode 145, the process of forming the second varistor 222 is added. After this process, a cover layer 232 is formed, and a laminated body block is fabricated. The laminated body block is cut and sintered in the same process in exemplary embodiment 1, and electrodes are formed, and the protection component of this exemplary embodiment is manufactured. In this exemplary embodiment, too, the ceramic layer 10 a zinc oxide sheet obtained by sintering zinc oxide green sheet.

The obtained protection component of the exemplary embodiment measures 1.6 mm in the longitudinal direction, 0.8 mm in the lateral direction, and 0.8 mm in the thickness direction. The capacitance between the external electrode for input 301 and external electrode for grounding 31 is 75 pF, and the varistor voltage V (1 mA) is V=27 V, and the capacitance between the external electrode for output 302 and external electrode for grounding 31 is 75 pF, and the varistor voltage V (1 mA) is V=27 V. The inductance between the external electrode for input 301 and external electrode for output 302 is 220 nH. Its impedance was 200 Ω or more in a frequency band of measuring frequency of 300 MHz to 800 MHz, same as the sample of inductance of 220 nH in the protection component in exemplary embodiment 1 shown in FIG. 4.

In the protection component of the exemplary embodiment, the suppressing effect on electrostatic discharge pulse was evaluated. The method of evaluation is same as in exemplary embodiment 1, and the protection component of the exemplary embodiment is used as the evaluation sample 109 shown in FIG. 5. That is, in this exemplary embodiment, too, the external electrode for input 203 is connected to the input side of the signal line 108, that is, the resistor 106 side, the external electrode for output 204 is connected to the output side of the signal line 108, that is, to the protected appliance 110 side, and the external electrode for grounding 205 is connected to the ground line 107. In this connection configuration, 8 kV of electrostatic discharge pulse applied from the circuit shown in FIG. 5 was applied, and the voltage waveform applied to the protected appliance 110 was measured, and the suppressing effect was evaluated. Results of evaluation are shown in FIG. 12.

Figure 12:
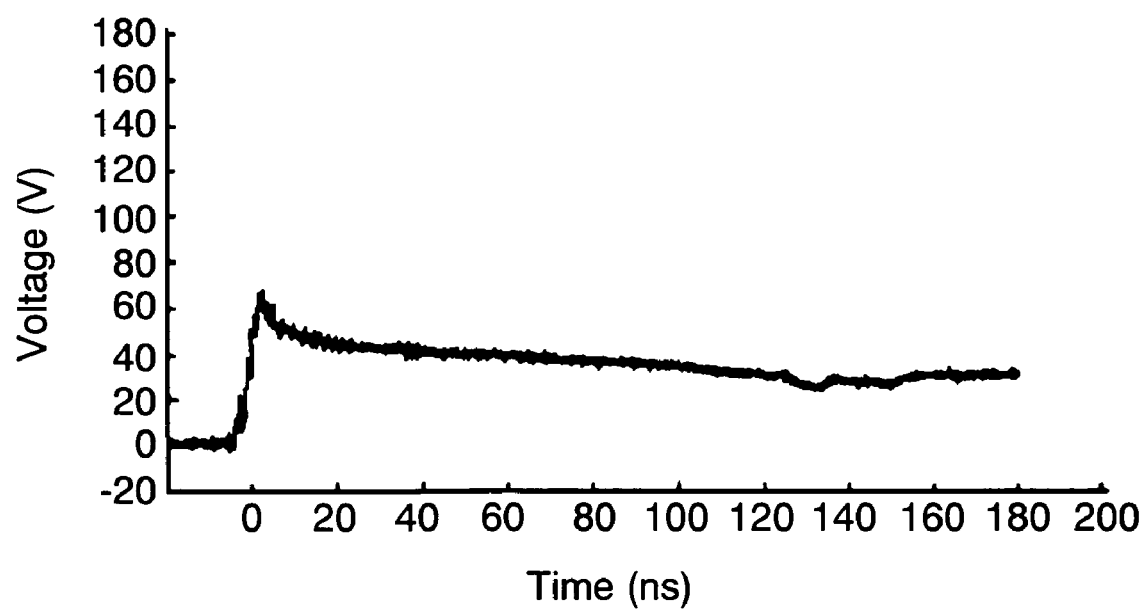
FIG. 12 is a diagram of voltage waveform applied to the protected appliance furnished with the protection component in the exemplary embodiment.

As shown in FIG. 12, when the protection component of the exemplary embodiment was disposed, the peak voltage of the voltage waveform applied to the protected appliance 110 was 65 V, and a large voltage suppressing effect was confirmed. Contrary to this configuration, by connecting the external electrode for input 203 of the protection component of the exemplary embodiment to the output side of the signal line 108, that is, the protected appliance 110 side, connecting the external electrode for output 204 to the input side of the signal line 108, that is, to the resistor 106 side, and connecting the external electrode for grounding 205 to the ground line 107, a similar electrostatic discharge test was conducted. In this case, too, 8 kV of electrostatic discharge pulse applied from the circuit shown in FIG. 5 was applied, and the voltage waveform applied to the protected appliance 110 was measured. As a result, also in this configuration, the peak voltage of the voltage waveform applied to the protected appliance 110 was 65 V, and a substantial voltage suppressing effect was obtained.

By way of comparison, of the same protection component in exemplary embodiment 1, a sample of which inductance is 220 nH was measured by connecting reversely to the connection configuration of the electrostatic discharge test in the case of exemplary embodiment 1. That is, the external electrode for input 203 of this sample is connected to the output side of the signal line 108, that is, the protected appliance 110 side, the external electrode for output 204 is connected to the input side of the signal line 108, that is, to the resistor 106 side, and the external electrode for grounding 205 is connected to the ground line 107. In this constitution, 8 kV of electrostatic discharge pulse applied from the circuit shown in FIG. 5 was applied, and the voltage waveform applied to the protected appliance 110 was measured and evaluated. Results are shown in FIG. 13.

Figure 13:
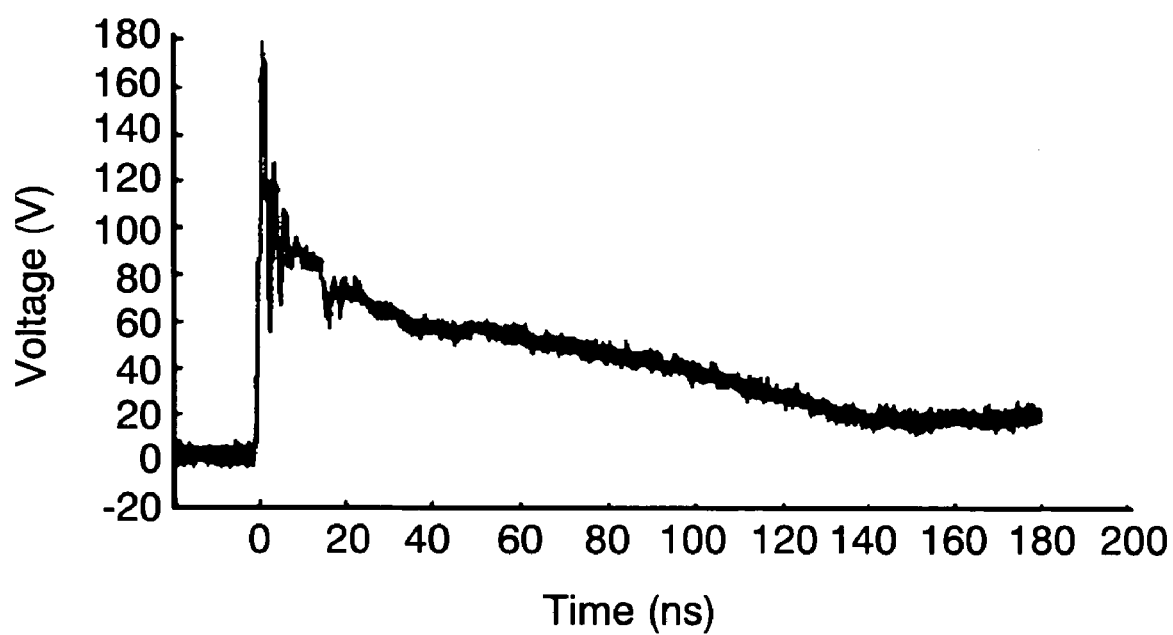
FIG. 13 is a diagram of voltage waveform applied to the protected appliance furnished with the protection component of exemplary embodiment 1 with inductance of 220 nH connected reversely in the exemplary embodiment.

As shown in FIG. 13, when connected reversely by using this sample, the peak voltage of the voltage waveform applied to the protected appliance 110 is 180 V, and the voltage suppressing effect is lowered as compared with the connection configuration shown in FIG. 9.

However, as clear from the equivalent circuit diagram and electrostatic discharge test results in FIG. 11, the protection component of the exemplary embodiment has same effects on both input side and output side, and when electrostatic discharge is carried out from either side, it is known that the voltage suppressing effects as shown in FIG. 12 are obtained. Hence, by using the protection component of the exemplary embodiment, it is not required to check the direction of the component in the mounting process, and the assembling process of electronic appliance can be simplified outstandingly.

THIRD EXEMPLARY EMBODIMENT

Figure 14:
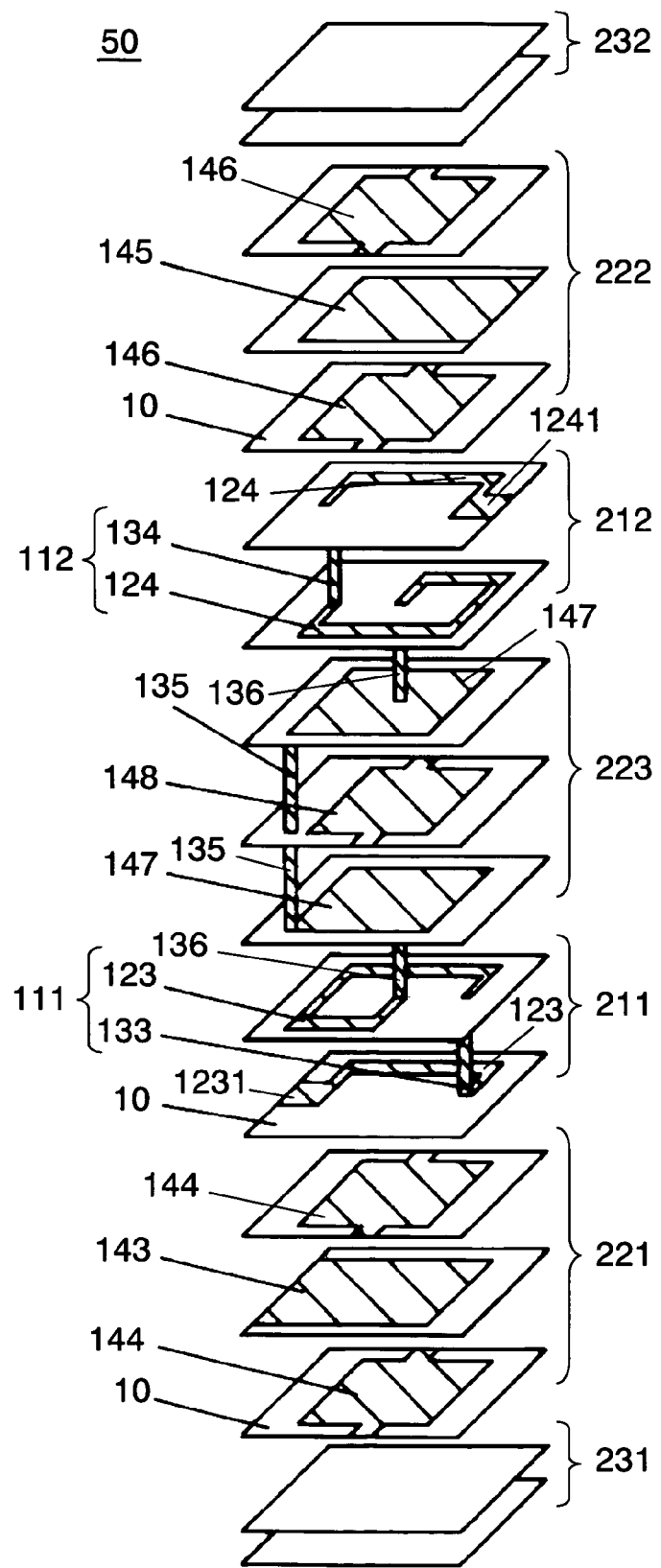
FIG. 14 is a schematic perspective exploded view of ceramic sinter for composing a protection component in exemplary embodiment 3 of the invention.
Figure 15:
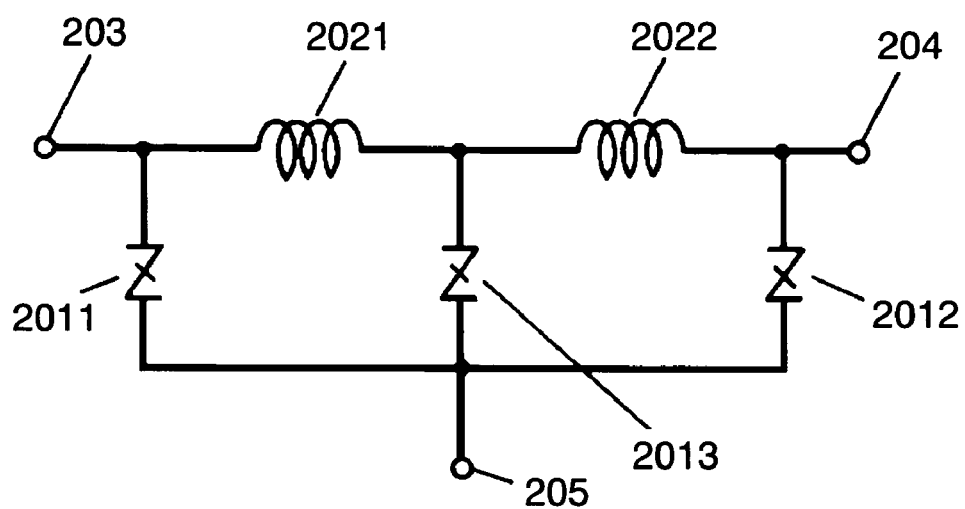
FIG. 15 is an equivalent circuit diagram of the protection component in the exemplary embodiment.

A protection component in exemplary embodiment 3 of the invention is described specifically below while referring to the drawings. FIG. 14 is a schematic perspective exploded view of ceramic sinter 50 for composing a protection component in this exemplary embodiment. FIG. 15 is an equivalent circuit diagram of this protection component.

What the protection component of this exemplary embodiment differs from the protection component in exemplary embodiment 1 and exemplary embodiment 2 lies in the structure of the ceramic sinter. That is, in this exemplary embodiment, it is characteristic that the ceramic sinter has two inductors and three varistors. The outline shape of the protection component of the exemplary embodiment is same as exemplary embodiment 1 and exemplary embodiment 2, and FIG. 1 is cited when describing the outline structure. Same constituent components as in exemplary embodiment 1 and exemplary embodiment 2 are identified with same reference numerals.

A ceramic sinter 50 composing the protection component of the exemplary embodiment is an integrated laminated body of cover layers 231, 232, first inductor 211, second inductor 212, first varistor 221, second varistor 222, and third varistor 223.

The cover layers 231, 232, first varistor 221, and second varistor 222 are composed same as in the ceramic sinter 40 in exemplary embodiment 2. It is a feature of this exemplary embodiment that the third varistor 223 is formed between the first inductor 211 and second inductor 212. This configuration is mainly described below.

The first inductor 211 is formed on the first varistor 221. The spiral coil conductor 111 is formed by connecting the wiring conductor 123 formed on the ceramic layer 10 by the via conductor 133 filling the via (not shown) of the ceramic layer 10. In FIG. 14, this spiral coil conductor 111 has about 1.5 turns. One end 1231 of the coil conductor 111 is drawn to one shorter side of the ceramic sinter 50. Other end of the coil conductor 111 is connected to the middle of the first internal electrode 147 of the third varistor 223 by means of the via conductor 136.

The third varistor 223 is formed on the first inductor 211. This third varistor 223 is formed by alternately laminating the first internal electrode 147 and second internal electrode 148 on the ceramic layer 10. The first internal electrodes 147 are mutually connected in the ceramic sinter 50 by means of the via conductor 135. The third varistor 223 is also connected to the wiring conductor 124 of the coil conductor 112 by means of the via conductor 136 provided in the middle of the internal electrode 147 formed in the upper layer side ceramic layer 10. Both ends of the second internal electrode 148 are drawn out to both longer sides of the ceramic sinter 50. In FIG. 14, the third varistor 223 is formed by laminating three layers of ceramic layer 10.

In the second inductor 212, similarly, the spiral coil conductor 112 is formed inside the ceramic sinter 50. That is, the wiring conductor 124 is formed on the ceramic layer 10, and the wiring conductors 124 are mutually connected by the via conductor 134, and a second inductor 212 of about 1 turn is formed. One end 1241 of the coil conductor 112 is drawn out to the shorter side of the ceramic sinter 50. Other end is connected to the middle of the first internal electrode 147 of the third varistor 223 by means of the via conductor 136 as mentioned above.

The second varistor 222 is formed on the second inductor 212.

In the first varistor 221, the ceramic layer 10 and first internal electrodes 143 and second internal electrodes 144 are laminated alternately. The first internal electrode 143 is formed by shifting slightly to one end of the ceramic layer 10, and the ends of the second internal electrode 144 are drawn out to both longer sides. In the second varistor 222, too, the ceramic layer 10 and first internal electrodes 145 and second internal electrodes 146 are laminated alternately. The first internal electrode 145 is formed by shifting slightly to one end of the ceramic layer 10, and the ends of the second internal electrode 146 are drawn out to both longer sides.

After laminating in this structure, it is cut, sintered and processed in the same manufacturing method as shown in exemplary embodiment 1. Later, external electrodes are formed on the ceramic sinter 50. That is, at one shorter side of the ceramic sinter 50, an external electrode for input 301 is formed for electrically connecting to one end 1231 of the coil conductor 111 composing the first inductor 211 and to the first internal electrode 143 of the first varistor 221. At other shorter side of the ceramic sinter 50, an external electrode for output 302 is formed for electrically connecting to one end 1241 of the coil conductor 112 composing the second inductor 212 and to the first internal electrode 145 of the second varistor 222. At both longer sides of the ceramic sinter 50, external electrodes for grounding 31 are formed for electrically connecting to the ends of the second internal electrode 144 of the first varistor 221, second internal electrode 146 of the second varistor 222, and second internal electrode 148 of the third varistor 223.

Thus, the protection component same in shape and appearance as in exemplary embodiment 1 in FIG. 1 is obtained. In this exemplary embodiment, the first varistor 221, second varistor 222, and third varistor 223 are formed by laminating three ceramic layers 10 each, but the number of layers is not particularly specified. As many layers as required in design can be laminated. Similarly, the first inductor 211 and second inductor 212 are composed to have about 1 turn in the exemplary embodiment, but the number of turns may be increasing by laminating more layers.

In this exemplary embodiment, too, the ceramic layer 10 is a zinc oxide sheet obtained by sintering zinc oxide green sheet.

As described herein, the protection component of the exemplary embodiment is an integral sintered structure of two inductors 211, 212 and three varistors 221, 222, 223. The first inductor 211 and second inductor 212 are electrically connected in series, and are electrically connected to the external electrode for input 301 and external electrode for output 302. The first varistor 221 is electrically connected to the external electrode for input 301 and external electrode for grounding 31. The second varistor 222 is electrically connected to the external electrode for output 302 and external electrode for grounding 31. The third varistor 223 is electrically connected to the first inductor 211 and second inductor 212 at one side, and to the external electrode for grounding 31 at other side.

In this exemplary embodiment, on the basis of the shape shown in FIG. 1, the region of forming the external electrode for input 301 and external electrode for output 302 forms shorter sides, but these external electrodes may not be always formed at the shorter sides. That is, depending on the internal structure, the external electrode for input 301 and external electrode for output 302 may be formed at the longer sides, and the external electrodes for grounding 31 may be formed at the shorter sides.

A circuit configuration of this protection component is shown in an equivalent circuit diagram in FIG. 15. In FIG. 15, a first varistor 2011, a second varistor 2012, a third varistor 2013, a first inductor 2021, and a second inductor 2022 correspond respectively to the first varistor 221, second varistor 222, third varistor 223, first inductor 211, and second inductor 212 of the protection component. Similarly, an external electrode for input 203, an external electrode for output 204, and an external electrode for grounding 205 correspond respectively to the external electrode for input 301, external electrode for output 302, and external electrode for grounding 31 of the protection component.

The obtained protection component of the exemplary embodiment measures 1.6 mm in the longitudinal direction, 0.8 mm in the lateral direction, and 0.8 mm in the thickness direction. The capacitance between the external electrode for input 301 and external electrode for grounding 31 is 75 pF, and the varistor voltage V (1 mA) is 27 V, and the capacitance between the external electrode for output 302 and external electrode for grounding 31 is 75 pF, and the varistor voltage V (1 mA) is 27 V. The inductance between the external electrode for input 301 and external electrode for output 302 is 68 nH. Its impedance was 200 Ω or less in a frequency band of measuring frequency of 300 MHz to 800 MHz, same as the sample of inductance of 68 nH in the protection component in exemplary embodiment 1 shown in FIG. 4.

In the protection component of the exemplary embodiment, the suppressing effect on electrostatic discharge pulse was evaluated. The method of evaluation is same as in exemplary embodiment 1, and the protection component of the exemplary embodiment is used as the evaluation sample 109 shown in FIG. 5. That is, in the protection component of this exemplary embodiment, the external electrode for input 301 is connected to the input side of the signal line 108 shown in FIG. 5, that is, to the resistor 106 side, the external electrode for output 302 is connected to the output side of the signal line 108, that is, to the protected appliance 110 side, and the external electrode for grounding 31 is connected to the ground line 107. In this connection configuration, later, 8 kV of electrostatic discharge pulse applied from the circuit shown in FIG. 5 was applied, and the voltage waveform applied to the protected appliance 110 was measured, and the suppressing effect was evaluated. Results of evaluation are shown in FIG. 16.

Figure 16:
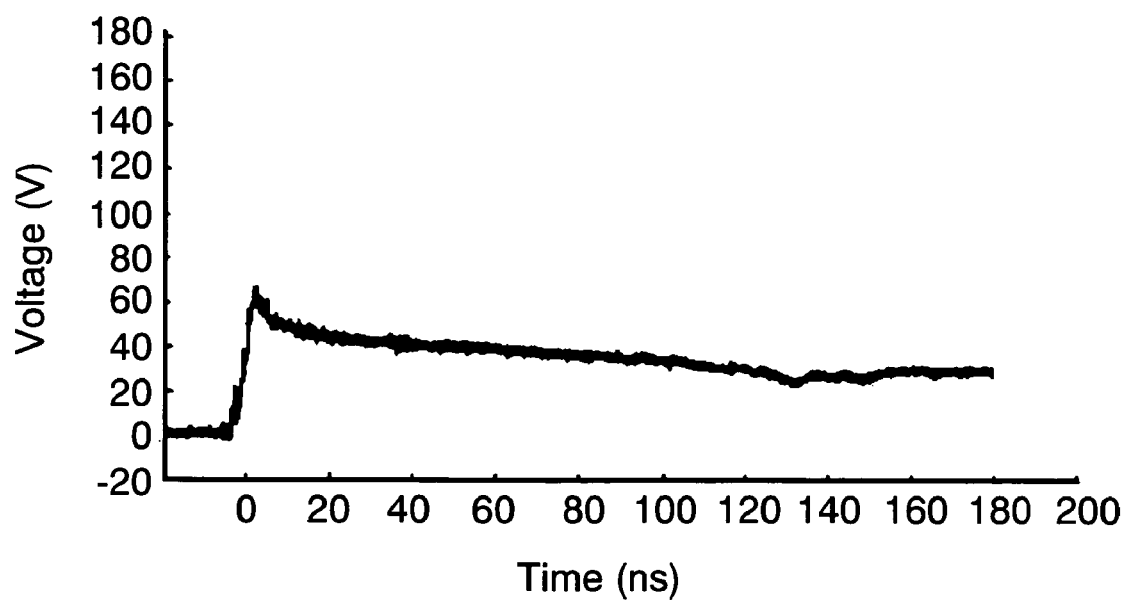
FIG. 16 is a diagram of voltage waveform applied to the protected appliance furnished with the protection component in the exemplary embodiment.

As shown in FIG. 16, when the protection component of the exemplary embodiment was disposed, the peak voltage of the voltage waveform applied to the protected appliance 110 was 65 V, and a large voltage suppressing effect was confirmed.

In the protection component shown in FIG. 8, as compared with the sample of which inductance of the inductor is 68 nH, the peak value showing the suppressing effect was about 10 V lower. As a result, the protection component of the exemplary embodiment was known to have a substantial voltage suppressing effect of the impedance value is low.

Also, as clear from the equivalent circuit diagram in FIG. 15, the protection component of the exemplary embodiment has same effects on both input side and output side, and when electrostatic discharge is carried out from either side, it is known that the voltage suppressing effects as shown in FIG. 16 are obtained. Hence, by using the protection component of the exemplary embodiment, it is not required to check the direction of the component in the mounting process, and the assembling process of electronic appliance can be simplified outstandingly.

FOURTH EXEMPLARY EMBODIMENT

Figure 17:
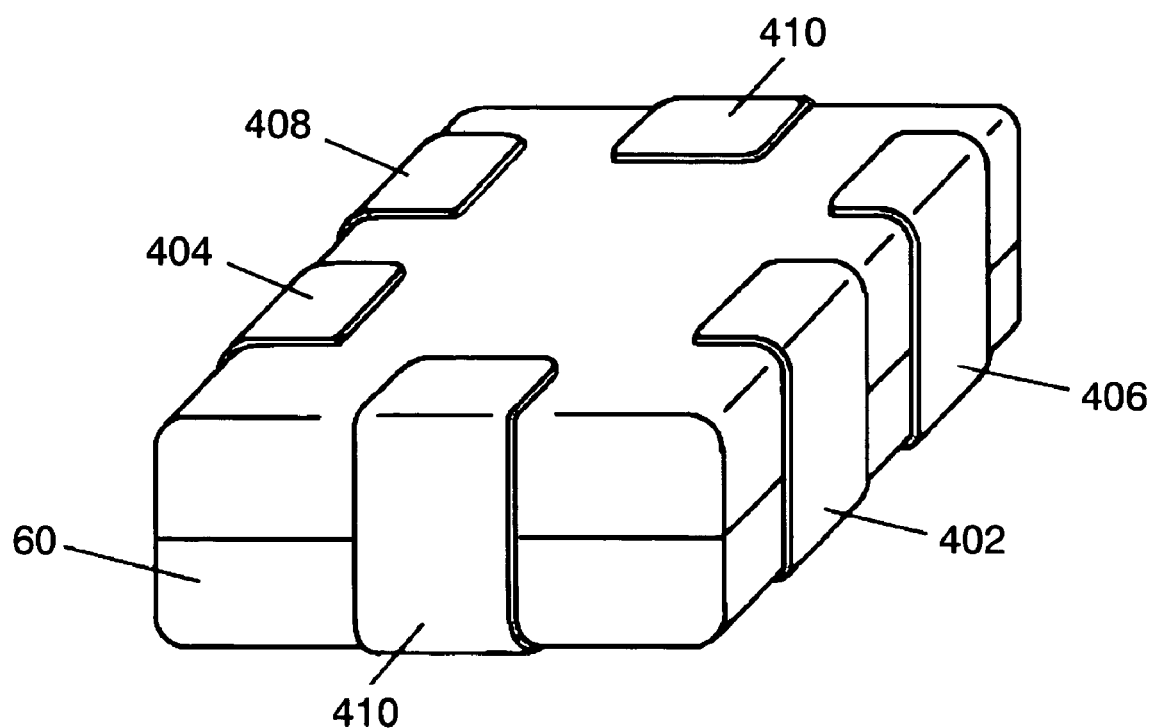
FIG. 17 is an outline perspective view of a protection component in exemplary embodiment 4 of the invention.
Figure 18:
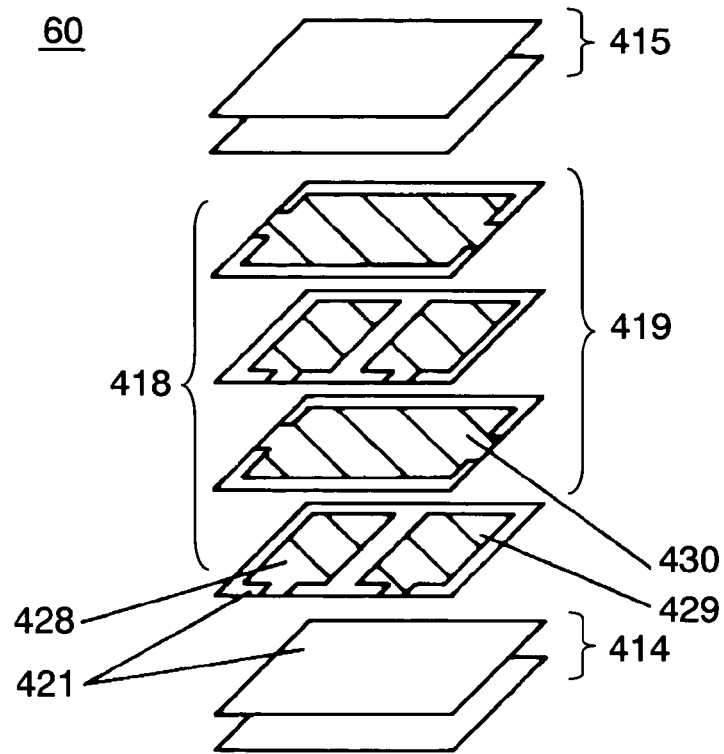
FIG. 18 is a schematic perspective exploded view of ceramic sinter for composing the protection component in the exemplary embodiment.
Figure 18:
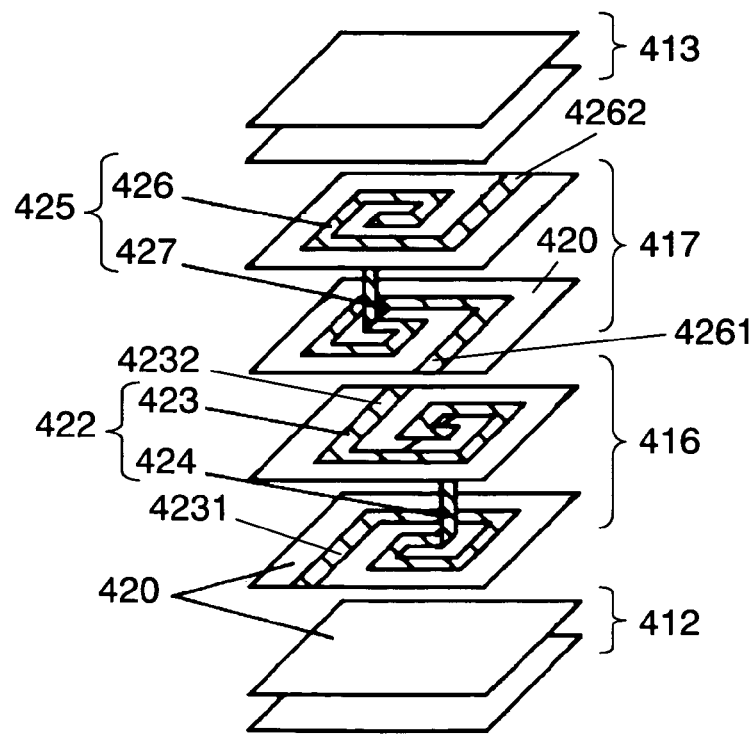
Figure 19:
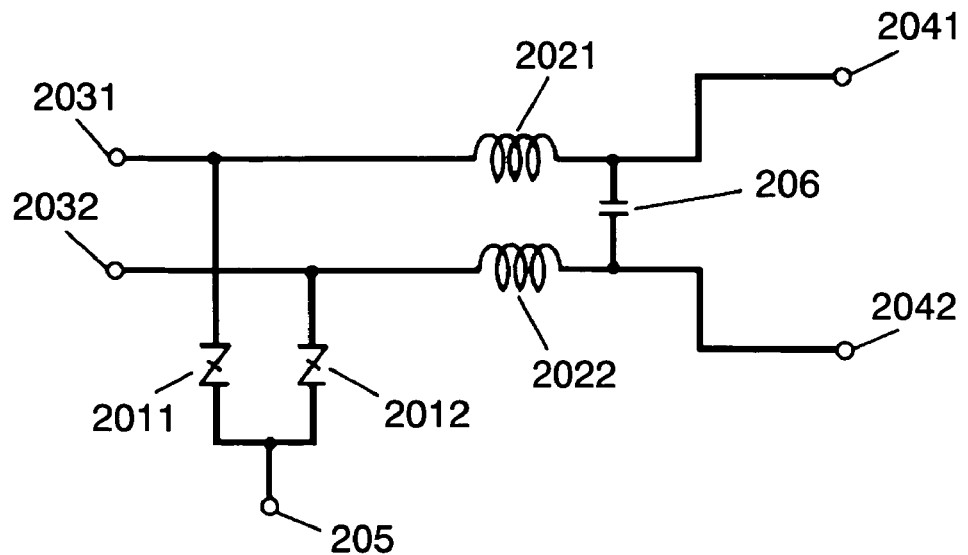
FIG. 19 is an equivalent circuit diagram of the protection component in the exemplary embodiment.

FIG. 17 is an outline perspective view of protection component in exemplary embodiment 4 of the invention. FIG. 18 is a schematic perspective exploded view of ceramic sinter 60 for composing the protection component. FIG. 19 is an equivalent circuit diagram of the protection component.

As shown in FIG. 17, the protection component of the exemplary embodiment includes a first external electrode for input 402, a first external electrode for output 404, a second external electrode for input 406, a second external electrode for output 408, and external electrodes for grounding 401, which are formed at each end of a ceramic sinter 60. The first external electrode for input 402 and first external electrode for output 404 form a pair, and the second external electrode for input 406 and second external electrode for output 408 form a pair.

As clear from the schematic perspective exploded view of ceramic sinter 60 in FIG. 18, the ceramic sinter 60 is an integral laminated structure of cover layers 412, 413, 414, 415, first inductor 416, second inductor 417, first varistor 418, and second varistor 419.

The structure of the ceramic sinter 60 is described below.

The first inductor 416 is formed by a spiral coil conductor 422 connecting a wiring conductor 423 formed on the ceramic layer 420 by a via conductor 424 filling the via (not shown) formed nearly in the middle of the ceramic layer 420. One end 4231 and other end 4232 of the wiring conductor 423 for composing the coil conductor 422 are drawn out to the mutually opposite ends.

The second inductor 417 is similarly formed by a spiral coil conductor 425 connecting a wiring conductor 426 formed on the ceramic layer 420 by a via conductor 427 filling the via (not shown) formed nearly in the middle of the ceramic layer 420. One end 4261 and other end 4262 of the wiring conductor 426 for composing the coil conductor 425 are drawn out to the mutually opposite ends.

The ends 4231, 4232 of the wiring conductor 423 of the first inductor 416 and the ends 4261, 4262 of the wiring conductor 426 of the second inductor 417 are similar ends, but are drawn out to different positions.

The first varistor 418 is formed by alternately laminating the ceramic layer 421, first internal electrode 428, and second internal electrode 430 as shown in the drawing. One end of the first internal electrode 428 is drawn out to the same position at the same end as the end 4231 of the wiring conductor 423 of the first inductor 416. Both ends of the second internal electrode 430 are drawn out to the middle of the end in the vertical direction to the above end.

The second varistor 419 is similarly formed by alternately laminating the ceramic layer 421, third internal electrode 429, and second internal electrode 430 as shown in the drawing. One end of the third internal electrode 429 is drawn out to the same position at the same end as the end 4261 of the wiring conductor 426 of the second inductor 417. Both ends of the second internal electrode 430 are drawn out to the middle of the end in the direction orthogonal to the above end.

As shown in the drawing, the first internal electrode 428 and third internal electrode 429 are formed on the same ceramic layer 421, and the size is about ½ as compared with the second internal electrode 430. The first internal electrode 428 and third internal electrode 429 are electrically separated in shape.

After laminating in this structure, by cutting into specified shape, sintering, processing the ends and exposing the electrode surfaces, a ceramic sinter 60 is obtained.

The ceramic sinter 60 has external electrodes formed on the ends. The first external electrode for input 402 is formed so as to be connected electrically to one end 4231 of the wiring conductor 423 of the coil conductor 422 and the first internal electrode 428 of the first varistor 418. The second external electrode for input 406 is formed so as to be connected electrically to one end 4261 of the wiring conductor 426 of the coil conductor 425 and the third internal electrode 429 of the second varistor 419.

Further, the first external electrode for output 404 is formed so as to be connected electrically to the other end 4232 of the wiring conductor 423 of the coil conductor 422. The second external electrode for output 408 is formed so as to be connected electrically to the other end 4262 of the wiring conductor 426 of the coil conductor 425. The external electrodes for grounding 410 are formed so as to be connected electrically to the both ends of the second internal electrode 430 common to the first varistor 418 and second varistor 419. Thus, the external electrodes are shown in FIG. 17 are formed. As known from FIG. 17, these external electrodes are individually separated electrically.

In the protection component of the exemplary embodiment, as described herein, two inductors and two varistors are integrally fabricated in the ceramic sinter 60. That is, an equivalent circuit as shown in FIG. 19 is realized. The relation between this equivalent circuit and the protection component of the exemplary embodiment is described below. In FIG. 19, the first varistor 2011 and second varistor 2012 correspond to the first varistor 418 and second varistor 419 of the protection component. The first inductor 2021 and second inductor 2022 correspond to the first inductor 416 and second inductor 417 respectively. The first external electrode for input 2031, second external electrode for input 2032, first external electrode for output 2041, second external electrode for output 2042, and external electrodes for grounding 205 correspond to the first external electrode for input 402, second external electrode for input 406, first external electrode for output 404, second external electrode for output 408, and external electrodes for grounding 410, respectively.

Since the coil conductor 422 of the first inductor 416 and the coil conductor 425 of the second inductor 417 are close to each other, they are equivalently coupled electrically by way of a capacitive component 206.

As explained herein, the protection component of the exemplary embodiment comprises two lines of circuit configuration in which the inductor is connected electrically to the external electrode for input and external electrode for output, and the varistor is connected electrically to the external electrode for input and external electrode for grounding.

A manufacturing method of the protection component in the exemplary embodiment is explained below while referring to FIG. 17 and FIG. 18.

First of all, two sheets are prepared, which are used as ceramic layers 420, 421 after sintering. These are ferrite green sheet comprising ceramic powder mainly composed of ferrite and an organic binder, and zinc oxide green sheets comprising ceramic powder mainly composed of zinc oxide and an organic binder. The thickness of each green sheet is about 50 µm. After sintering, they are formed as a ceramic layer 420 of ferrite sheet and a ceramic layer 421 of zinc oxide sheet, but they are not distinguished before and after sintering in the following explanation, and are respectively called ferrite green sheet 420 and zinc oxide green sheet 421.

Consequently, a plurality of ferrite green sheets 420 are laminated, and a lower side cover layer 412 is formed. In succession, a conductor paste mainly composed of silver is applied on the cover layer 412, and a conductor wiring 423 is formed by screen printing method. Further on the wiring conductor 423, a ferrite green sheet 420 forming a via conductor 424 filled with silver paste is laminated at a position to be connected electrically. After lamination, silver paste is further applied, and a wiring conductor 423 is formed by screen printing method. In this process, a first inductor 416 is formed.

By repeating the same process, a wiring conductor 426 is formed, and a second inductor 417 is formed. After forming the second inductor 417, further, a plurality of ferrite green sheets 420 are laminated on this sheet, and an intermediate cover layer 413 is formed. As a result, the first inductor 416 composed of coil conductor 422 and the second inductor 417 composed of coil conductor 425 can be fabricated.

Further thereon, by laminating a plurality of zinc oxide green sheets 421, an intermediate cover layer 414 is formed. In succession, a conductor paste mainly composed of silver is applied on the cover layer 414, and a first internal electrode 428 and a third internal electrode 429 are formed on the same sheet by screen printing method. Further after laminating the zinc oxide green sheet 421 thereon, silver paste is applied, and a second internal electrode 430 is formed by screen printing method. By repeating this process several times, a first varistor 418 and a second varistor 419 are formed.

By laminating a plurality of zinc oxide green sheets 421, an upper side cover layer 415 is formed, and thus a laminated body block is fabricated.

The thickness of each conductor layer is about 2.5 µm. In the lamination composition shown in FIG. 18, multiple pieces are printed simultaneously so that the shape may be as shown in FIG. 18 after cutting.

By cutting at specified positions and separating the laminated body block, individual green chips are formed. By heating the green chips in the atmosphere and removing the binder, they are heated and sintered at 930° C. in the atmosphere, and a sinter is obtained.

By processing the ends of the sinter, and exposing the wiring conductors and internal electrodes formed in the sinter on the surface, a ceramic sinter 60 is fabricated. A conductive paste mainly composed of silver is applied to the ends of the ceramic sinter 60, and by baking at 800° C., a first external electrode for input 402, a second external electrode for input 406, a first external electrode for output 404, a second external electrode for output 408, and an external electrodes for grounding 410 are formed, and further by plating with nickel or solder, the protection component in the exemplary embodiment is fabricated.

Figure 20:
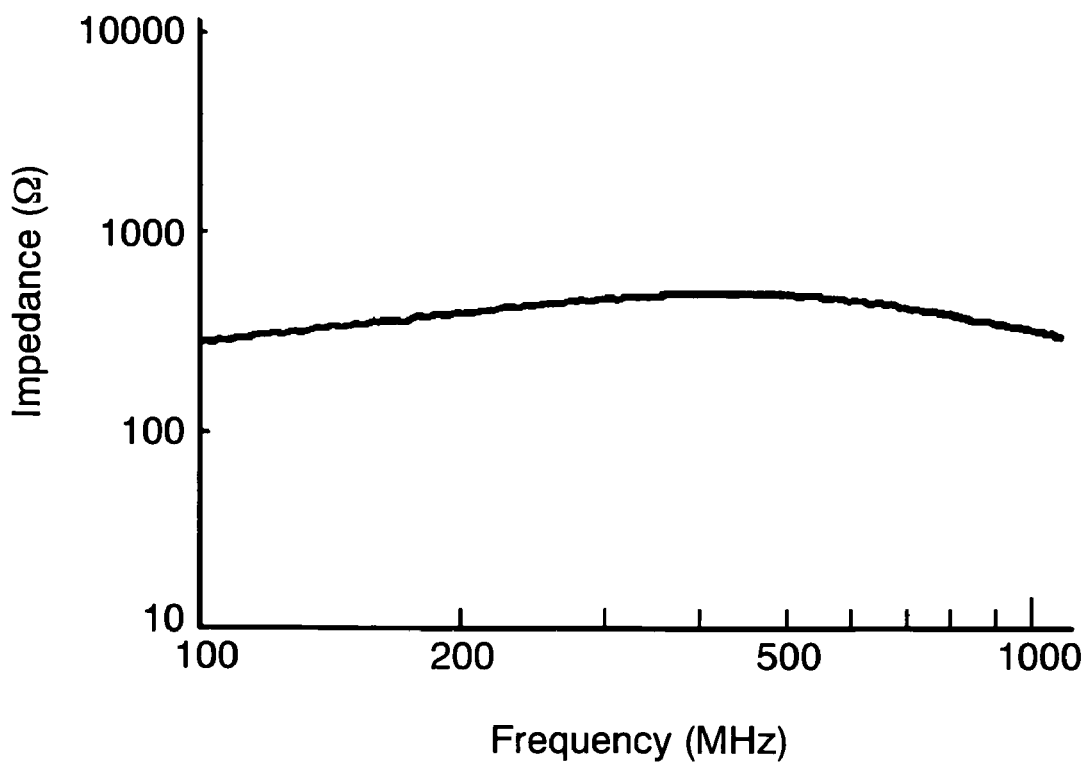
FIG. 20 is a diagram showing results of measurement of frequency characteristic of impedance of the protection component in the exemplary embodiment.

The obtained protection component of the exemplary embodiment measures 1.4 mm in the longitudinal direction, 1.0 mm in the lateral direction, and 0.8 mm in the thickness direction. The capacitance between the first external electrode for input 402 and external electrode for grounding 410 is 75 pF, and the varistor voltage V (1 mA) is 27 V. The impedance between the first external electrode for input 402 and first external electrode for output 404 is as shown in FIG. 20. That is, it was 200 Ω or more in the frequency band of measuring frequency of 300 MHz to 800 MHz. The capacitance between the second external electrode for input 406 and external electrode for grounding 410, the varistor voltage V, and the impedance between the second external electrode for input 406 and second external electrode for output 408 were also similar as mentioned above.

Next, an electrostatic discharge test was conducted in the protection component of the exemplary embodiment manufactured in this manner. The evaluation was same as the method of electrostatic discharge test explained in exemplary embodiment 1. That is, the protection component of the exemplary embodiment is the evaluation sample 109 shown in FIG. 5, and the first external electrode for input 2031 was connected to the input side of the signal line 108, that is, to the resistor 106 side, the first external electrode for output 2041 is connected to the output side of the signal line 108, that is, to the protected appliance 110 side, and the external electrode for grounding 205 is connected to the ground line 107. In this connection configuration, later, 8 kV of electrostatic discharge pulse applied from the circuit shown in FIG. 5 was applied, and the voltage waveform applied to the protected appliance 110 was measured, and the suppressing effect was evaluated. Results of evaluation are shown in FIG. 21.

Figure 21:
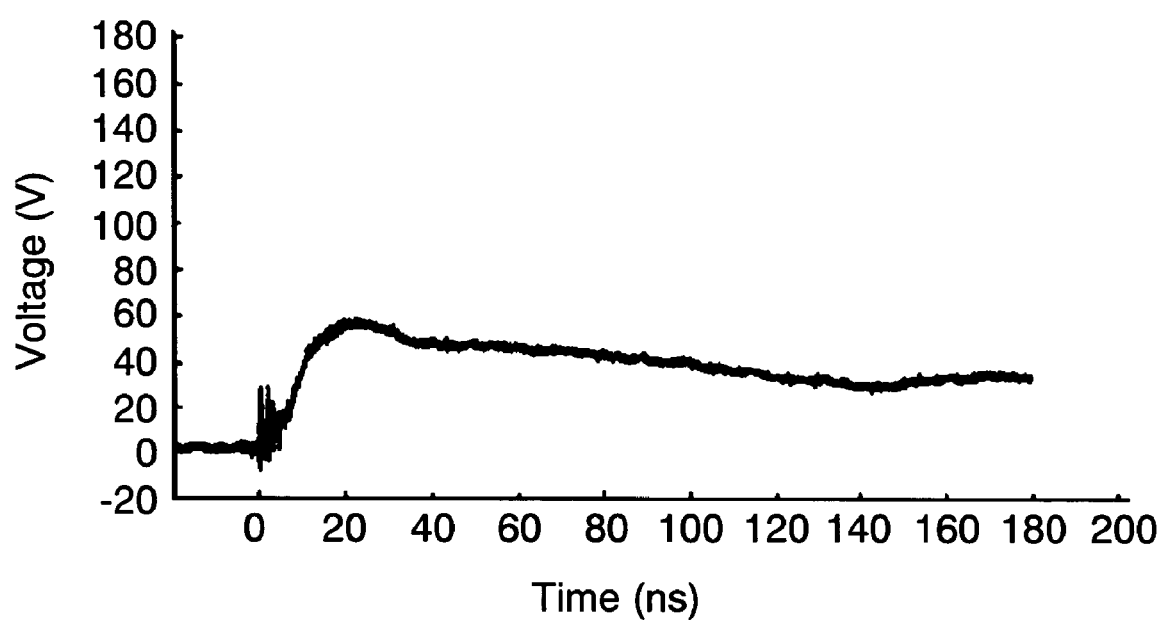
FIG. 21 is a diagram of voltage waveform applied to the protected appliance furnished with the protection component in the exemplary embodiment.

As shown in FIG. 21, when the protection component of the exemplary embodiment was disposed, the peak voltage of the voltage waveform applied to the protected appliance 110 was 60 V, and a greater voltage suppressing effect was confirmed as compared with exemplary embodiment 1, exemplary embodiment 2, or exemplary embodiment 3.

Suppressing effects were similarly evaluated by connecting the second external electrode for input 2032 to the input side of the signal line 108, that is, to the resistor 106 side, the second external electrode for output 2042 to the output side of the signal line 108, that is, to the protected appliance 110 side, and the external electrode for grounding 205 to the ground line 107, and the same results as in FIG. 21 were obtained.

The protection component of the exemplary embodiment is applicable to two lines by one system, and the number of parts and mounting cost can be curtailed. Further, since the two inductors enclosed by the ferrite sheet are mutually coupled capacitively, it also as the function as common mode noise filter. For example, when one protection component of exemplary embodiment 1 is provided in each one of the two signal lines, the impedance at 100 MHz in the common mode is several ohms to tens of ohms. By contrast, as in this exemplary embodiment, when the protection component having two lines is provided in two signal lines, the impedance at 100 MHz in the common mode is 100 Ω or more. As a result, a great effect as noise filter in the common mode is recognized.

In exemplary embodiment 1 to exemplary embodiment 4, the varistor is disposed in the ceramic layer composed of zinc oxide sheet, but it may be also disposed in a ceramic layer mainly composed of strontium titanate. The inductor is provided in the ceramic sheet composed of zinc oxide sheet in exemplary embodiment 1 to exemplary embodiment 3, and in the ceramic sheet composed of ferrite sheet in exemplary embodiment 4, but it is also possible to disposed in a ceramic sheet of low dielectric constant.

In exemplary embodiment 4, the ceramic sinter 60 is fabricated by integrally sintering the varistor provided in the ceramic sheet of zinc oxide sheet and the inductor provided in the ceramic layer of ferrite sheet. However, the invention is not limited to such configuration alone. For example, by individually cutting and sintering, a ceramic sinter 60 may be composed by adhering with an adhesive. By composing the ceramic sinter 60 in such manner and forming external electrodes, an protection component having similar performance can be realized. Within allowable ranges of mechanical strength and dimensions, the number of varistors or inductors may be increased to 4 or 8, for example, and 4 or 8 lines may be formed.

The protection components in exemplary embodiment 1 to exemplary embodiment 4 also have the function of low pass filter by the inductance of inductor and capacitance of varistor, and therefore by setting the inductance and capacitance at proper values, a multi-stage low pass filter of L type or pi-type may be realized, and the function as the low pass filter may be further enhanced.

Further, the protection component of the invention as the following features. That is, in the protection component of the invention, when the inductor has the impedance of 200 Ω or more in the frequency band of measuring frequency of 300 MHz to 800 MHz, peak voltage of about 0.5 to 2 nanoseconds of electrostatic discharge pulse can be suppressed more securely, and the protective effect of the electronic circuit of the appliance is more securely assured.

In the case of n-type configuration connecting the inductor in series to the signal line and the varistor parallel to the inductor, a function of low pass filter (noise filter) of high noise removing effect is realized by the inductance of the inductor and capacitance of the varistor.

In a configuration comprising a plurality of inductors and a plurality of varistors, by optimally setting the inductance of the inductor and capacitance of the varistor, a function of a desired multi-stage low pass filter (noise filter) maybe also realized.

Also in a configuration comprising a plurality of external electrodes for input and external electrodes for output, the inductors existing on different lines maybe electrically coupled capacitively, and an element having a function of common mode choke coil may be also realized.

What is claimed is:

1. An electrostatic discharge protection component comprising:
   a ceramic sinter; and
   an external input electrode, an external output electrode, and external ground electrodes formed on one or more surfaces including end surfaces of the ceramic sinter,
   said ceramic sinter including:
      an inductor electrically connecting the external input electrode and the external output electrode, said inductor including one or more inductor layers, and
      a varistor electrically connecting the external input electrode and the external ground electrodes, said varistor including one or more varistor layers,
   wherein the inductor is formed from a coil-shaped conductor disposed among said one or more inductor layers, and
   wherein said inductor layer and said varistor layer are formed by sintering laminated green sheets of a same varistor material.

2. The electrostatic discharge protection component of claim 1,
   wherein said inductor has an impedance of 200 Ω or more in a frequency band of 300 MHz to 800 MHz.

3. The electrostatic discharge protection component of claim 1,
   wherein said ceramic sinter further includes a second varistor for electrically connecting the external output electrode and the external ground electrodes.

4. The electrostatic discharge protection component of claim 1,
   wherein the inductor includes a plurality of inductors, the plurality of inductors are disposed in series between the external input electrode and the external output electrode, and
   a second varistor is disposed for electrically connecting the external output electrode and the external ground electrodes, and a further one or more varistors are disposed for electrically connecting to a common node of each of said plurality of inductors disposed in series, respectively, and the external ground electrodes.

5. The electrostatic discharge protection component of claim 1,
   wherein the external input electrode includes a plurality of external input electrodes, the external output electrode includes a plurality of external output electrodes, the inductor includes a plurality of inductors, and the varistor includes a plurality of varistors,
   each of the plurality of inductors are disposed for electrically connecting to each of the plurality of the external input electrodes, respectively and to each of the external output electrodes, and each of the plurality of varistors are disposed for electrically connecting to each of the plurality of external input electrodes, respectively and to each of the external ground electrodes.

6. An electrostatic discharge protection component comprising:
a ceramic sinter; and
an external input electrode, an external output electrode, and external ground electrodes formed on one or more surfaces including end surfaces of the ceramic sinter, said ceramic sinter including:
two or more inductors electrically connecting the external input electrode and the external output electrode and two or more varistors electrically connecting the external input electrode and the external ground electrodes, wherein each inductor is formed from a coil-shaped conductor disposed among one or more layers of said ceramic sinter, and wherein said two or more inductors and said two or more varistors are sintered using intermediate cover layers made of ferrite and zinc oxide before being integrated.

* * * * *